United States Patent [19]

Nishizawa et al.

[11] Patent Number: 5,222,682
[45] Date of Patent: Jun. 29, 1993

[54] BELT PRETENSIONER FOR A VEHICLE SEAT BELT RETRACTOR

[75] Inventors: Muneo Nishizawa; Tetsuya Hamaue, both of Shiga, Japan

[73] Assignee: Takata Corporation, Tokyo, Japan

[21] Appl. No.: 791,459

[22] Filed: Nov. 13, 1991

[30] Foreign Application Priority Data

Nov. 21, 1990 [JP] Japan .................................. 2-316832

[51] Int. Cl.$^5$ .............................................. B60R 22/46
[52] U.S. Cl. ...................................................... 242/107
[58] Field of Search ......... 242/107, 107.4 R, 107.4 A, 242/107.4 B, 107.4 R; 280/806, 807; 297/478, 480

[56] References Cited

U.S. PATENT DOCUMENTS 4,932,603 6/1990 Yamanoi et al. ................ 242/107

FOREIGN PATENT DOCUMENTS 1-19454 5/1989 Japan .
2125682 3/1984 United Kingdom .
2192124 1/1988 United Kingdom .
2202731 10/1988 United Kingdom .

*Primary Examiner*—John M. Jillions
*Attorney, Agent, or Firm*—Brumbaugh, Graves, Donohue & Raymond

[57] ABSTRACT

A belt pretensioner is provided for a vehicle safety belt system having a retractor from which and onto which a belt is arranged to be unwound and wound by rotation of a reel shaft. The pretensioner includes a pulley carrying a pulley gear and is ordinarily restrained in a position in which the pulley gear does not engage a shaft gear on the reel shaft and a pulling cable having a pulley-engaging segment wound onto the pulley and having a pulling segment leading from the pulley in a pulling direction to a power source arranged to pull on the cable and translate the pulley to engage the pulley gear with the shaft gear and rotate the pulley such the gears rotate the reel shaft and pretension the belt by winding it onto the reel shaft. The pulling cable has a pulled segment leading away from the pulley-engaging segment from the end thereof opposite the pulling segment in a direction substantially aligned with the pulling direction. A portion of the pulled segment frictionally engages fixed braking surfaces on the retractor. The pulley is restrained by the pulling and pulled segments of the pulling cable in a position in which the gears are not engaged.

1 Claim, 5 Drawing Sheets

BELT PRETENSIONER FOR A VEHICLE SEAT BELT RETRACTOR

BACKGROUND OF THE INVENTION

The present invention relates to a pretensioner for a vehicle seat belt system and, in particular, to a pretensioner of the type in which the belt is tightened by rotating a belt reel of a retractor in the belt-winding direction.

In some vehicle seat belt systems, a belt pretensioner is provided for the purpose of preventing a secondary collision of an occupant of the vehicle by operating in an emergency and by tightly restraining the body of the occupant on the seat of the vehicle.

Japanese Provisional Patent Publication No. 119454/1989, for example, describes and shows a pretensioner in which a belt is wound and tightened by rotating a pulley that is connected, upon operation of the pretensioner, to a belt take-up shaft of a seat belt retractor by a coupling unit. The pulley is rotated by a cable coupled to a driving power source and wound onto the pulley. The coupling unit comprises a pair of gears, one of which is fixed on the take-up shaft and the other of which is fixed on the pulley. The pulley is supported on a movable support member that is ordinarily held in a position such that the gears do not mesh by a shear pin, so the retractor can operate normally, without interacting with the pretensioner, except in an emergency that results in operation of the pretensioner. When the operation of the pretensioner is triggered, the gears are engaged with each other upon shearing of the shear pin and movement of the pulley support member.

In the above-described known device, the rotation of the gear on the pulley must be restrained until the gears are engaged in proper mesh. Accordingly, a shear pin having an accurate shear load operating in two steps is required. Also, because a very large load is exerted on the pulley instantaneously (on the order of milliseconds), a slight change in resistance to shear may have a large influence on the operation of the system. Also, it is necessary to have a strong support member to carry the operating load, and a power loss is involved in freeing the guiding unit from restraint by the shear pin.

SUMMARY OF THE INVENTION

An object of the present invention is to provide a belt pretensioner of the type that rotates a belt retractor reel shaft in which the same operational control as in the previously known arrangement is achieved but a power loss during operation is avoided by having the pulling cable serve the functions of restraining the pulley and guiding the pulley to engage a gear on the pulley with a gear on the retractor reel shaft upon operation of the power unit.

The foregoing object is attained, in accordance with the present invention, by a belt pretensioner for a vehicle safety belt system having a retractor from which and onto which a belt is unwound and wound by rotation of a reel shaft. The pretensioner includes a pulley carrying a pulley gear and is ordinarily restrained in a position in which the pulley gear does not engage a shaft gear on the reel shaft. A pulling cable includes a pulley-engaging segment wound onto the pulley and a pulling segment leading from the pulley in a pulling direction to a power source arranged to pull on the cable and translate the pulley to engage the pulley gear with the shaft gear and rotate the pulley such the gears rotate the reel shaft and pretension the belt by winding it onto the reel shaft.

The invention is characterized in that the pulling cable has a pulled segment leading away from the pulley-engaging segment from the end thereof opposite the pulling segment in a direction substantially aligned with the pulling direction and in that a portion of the pulled segment frictionally engages fixed braking surfaces on the retractor. The pulley is restrained by the pulling and pulled segments of the pulling cable in a position in which the gears are not engaged.

In particular, the substantially aligned pulling segment and pulled segment of the pulling cable are sufficiently stiff to hold the pulley in a position in which the pulley gear does not engage the reel shaft gear under forces imposed on it in normal operation of the vehicle, such as by jolts and vibrations of the vehicle. The relatively small forces required to hold the pulley in the inoperative position are provided by friction engagement between the belt segment and braking surfaces on the retractor. When the power unit is triggered in response to an inertial sensor in a vehicle collision or other emergency event, the pulling segment of the pulling cable translates the pulley in a direction to engage the pulley gear with the reel shaft gear; meanwhile, the frictional force between the pulled segment of the cable and the braking surfaces on the retractor are sufficient to permit that translation to occur by sustaining a force equal to, and acting in substantially the same direction as and substantially aligned with, the force applied to the pulling segment by the power source. After engagement of the pulley gear with the reel shaft gear, the pulling force applied to the pulling cable by the power source overcomes the frictional force acting on the pulling segment of the cable and imparts rotation to the pulley which, in turn, imparts rotation of the reel shaft in the belt winding direction. A portion of the seat belt is, accordingly, wound onto the retractor reel and is pretensioned into firm engagement with the vehicle occupant. From the foregoing, it is apparent that the pulling cable serves the functions of supporting the pulley and the pulley gear in an inoperative position and guiding the pulley in a direction to engage the pulley gear with the reel shaft gear when the pretensioner is triggered.

For a better understanding of the invention, reference may be made to the following description of an exemplary embodiment, taken in conjunction with the accompanying drawings.

DESCRIPTION OF THE EMBODIMENT

Figure 1:
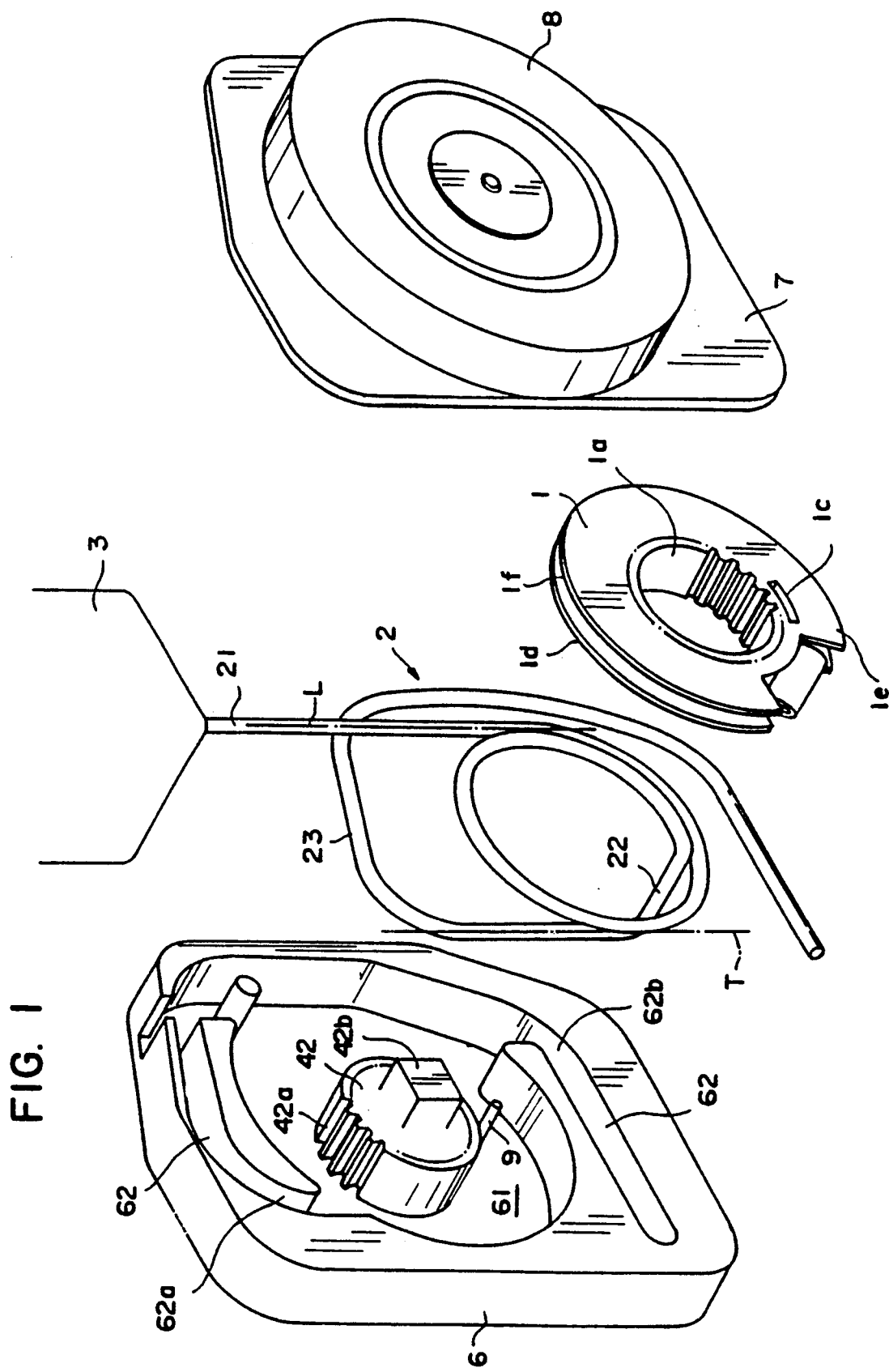
FIG. 1 is an exploded pictorial view of the embodiment.

A pulley-engaging segment 22 of a pulling cable 2 made of stranded wire is wound onto an annular pulley 1. A pulling segment 21 of the cable leads from the pulley-engaging segment 22 in a pulling direction L to a power source 3, which may be of any suitable type known in the art. External teeth 42a on a gear 42 that is non-rotatably mounted on an end of a seat belt retractor reel shaft 41 are engageable by internal teeth 1a on an inner wall of the pulley 1. When the power source 3 is triggered, the pulling segment 21 of the cable 2 imparts rotation to the reel shaft 41 in a direction to wind a portion of a seat belt 5 onto the retractor reel shaft, thereby pretensioning the belt into firm engagement with the vehicle occupant.

The pulling cable 2 has a pulled segment 23 that extends from the end of the pulley-engaging segment 22 opposite from the pulling segment 21 in a direction T that is substantially aligned with the pulling direction L of the pulling segment 21. A portion of the pulled segment 23 frictionally engages brake surfaces on a fixed component that is associated with the seat belt retractor 4. The retractor 4 may be of the emergency-locking type and of any suitable construction, many of which are well known in the art.

Figure 2:
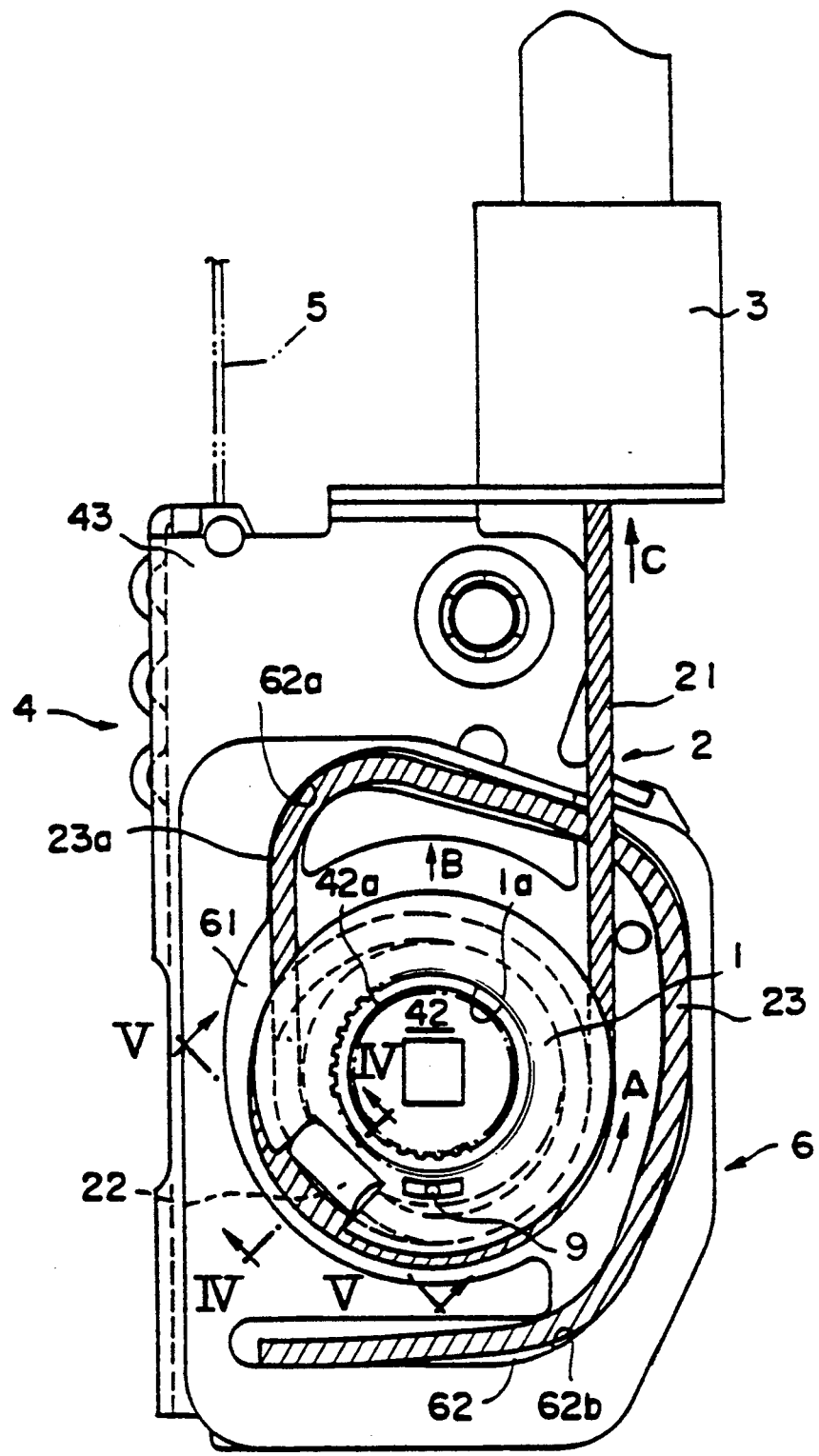
FIG. 2 is a side elevational view of the embodiment with a cover and a winding spring of the retractor removed.

In the embodiment, referring to FIGS. 1 and 2, a brake block 6 for frictionally engaging the pulled segment 23 of the cable 2 is fastened to a side wall of a U-shaped retractor frame 43. The brake block has a recess 61 of a generally elliptical shape and a channel 62 arranged generally along its circumference outwardly of the recess 61. A portion 62a of the circumferential channel 62 of the brake block 6 is curved at a smaller radius than other portions of the channel and forms braking surfaces that frictionally engage a portion 23a of the pulled segment 23.

Figure 3:
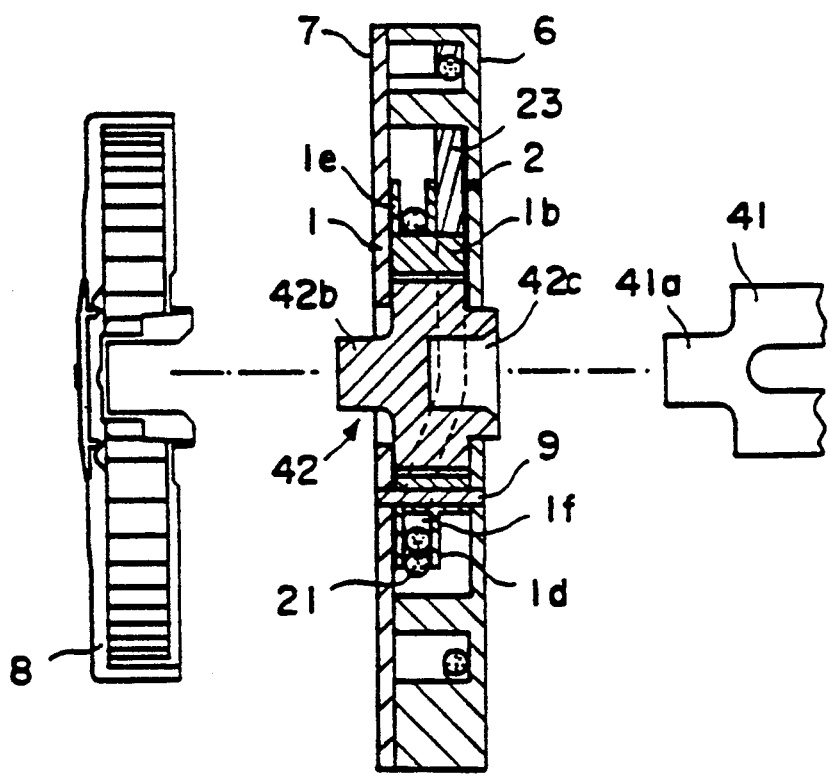
FIG. 3 is a fragmentary exploded cross-sectional view of some of the components of the embodiment, the cross section being taken through the axis of the reel shaft.

The gear 42 is mounted on the retractor reel shaft 41 by reception of a rectangular end portion 41a of the shaft in a hole 42 of matching shape in the gear (see FIG. 3). The gear 42c has a rectangular boss or shaft 42b that receives one end of a spiral spring that is part of a winding spring assembly 8 of the retractor.

The flanges 1d and 1f of the pulley 1 are wide enough in the radial direction to enable the pulling cable 2 to be wound onto the pulley in radially overlapping relation over approximately one-half of the circumferential extent of the pulley. Inside the pulley 1 is an axial flange 1b (see FIG. 3) that has a length equal to the diameter of the pulling cable 2. An arcuate hole 1c extends axially through the pulley, and receives a portion of a shear pin 9 that is mounted on the brake block at one end. The other end of the shear pin is received in a hole in a cover 7 for the winding spring assembly 8. The shear pin assists the cable 2 in restraining the pulley in an inactive position and may be omitted.

Figure 4:
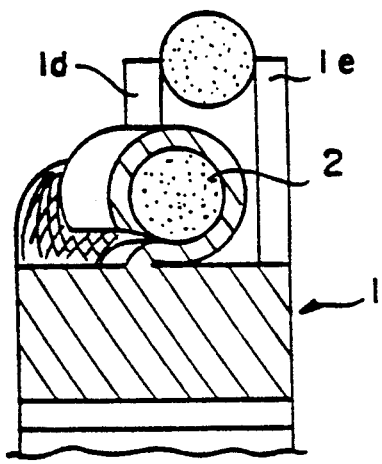
FIG. 4 is a fragmentary cross-sectional view taken along the lines IV—IV of FIG. 2 and on an enlarged scale.
Figure 5:
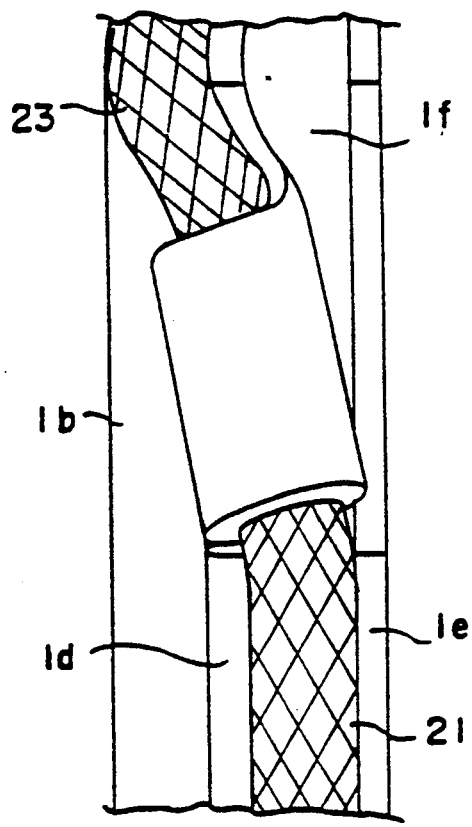
FIG. 5 is a fragmentary detailed view looking along the lines V—V of FIG. 2.

FIGS. 4 and 5 show a part of the cable 2 where it is affixed to the pulley 1. The part of the pulling cable 2 wound on the pulley 1 is engaged with the pulley by cutting a part of the inner radial flange 1d of the pulley 1 in the radial direction and by caulking it so that the pulling cable 2 is clamped within it. By this caulking, the pulling cable 2 is shifted from the pulley channel between inner and outer radial flanges 1e and 1d to a radial flange 1b through a portion where the radial flange 1d is lacking. Then, it is led away from the pulley along the pulled segment 23 into the channel 62. As shown in FIGS. 1 to 3, it is guided by a braking section 62a of the circumferential channel 62, and after going around the circumferential channel 62 and passing through a checking section 62b, it is terminated near an end of the channel.

From the pulled segment 23, the pulling cable 2 makes a full turn around the pulley along the inner periphery of the pulley channel 1f from the pulley-engaging segment 22. Then, it makes another half turn along the outer periphery of the pulley, crosses the circumferential channel 62 and is extended out of the brake block 6 along the pulling segment 21. The end of the pulling segment is fastened to a piston (not shown) of the power source 3.

The pulled segment and the pulling segment are at symmetrical positions with respect to a central axial line of the pulley 1 therebetween, and the pulley is stably maintained due to the stiffness of the cable. The lines T and L of said pulled and pulling segments of the pulling cable 2 are directed substantially in the same direction. As a result, when a pulling force is applied on the pulling segment 21 of the pulling cable 2, a force acting along a central axial line in the same direction as the pulling segment is applied to the pulley 1. In the embodiment, the two axial lines T and L are parallel and are directed in exactly the same direction, and the above force acting on the pulley is increased due to the mechanical advantage of the pulley arrangement. "The same direction" as mentioned in the present invention means simply that the direction is "not opposite," and the included angle between the two axial lines may be theoretically between 180° and 0°. Practically, however, it is desirable that it be close to 0°.

The brake block 6 is covered by a cover 7. A return spring assembly 8 of a retractor 4 is mounted on it in the present embodiment.

In a pretensioner, according to the present invention, the pulley i is positioned and held concentrically with the gear 42 by the pulling cable 2 in the inactive condition shown in FIG. 2. Because the external teeth 42a of the gear 42 and internal teeth 1a of the pulley 1 are not engaged with each other, the retractor 4 is able to function normally.

When a high acceleration occurs, such as in a collision of a vehicle, and is detected by a sensor, the power source is operated. The pulling cable 2 is pulled into the power source 3 in the direction shown by an arrow C, and the pulley 1 is subjected by the pulling cable to a rotating force counterclockwise, as shown by an arrow A in the figure. Friction between the brake block 6 and the pulling cable 2 exerts a braking force, which resists the pulling of the pulling cable 2, and a force toward the pulling direction shown by an arrow B is applied on the pulley 1 in addition to the above force. As a result, the central axis of the pulley 1 loses the concentricity with the central axis of the gear 42 and is displaced upwardly. Thus, the external teeth 42a of the gear 42 and the internal teeth 1a of the pulley 1 are engaged on the opposite side (at the lower position in FIG. 6) of the axial line from the pulling side.

After the external and the internal teeth 1a and 42a are engaged with each other, the pulley 1 cannot move and further in translation. Thus, the pulling force of the power source 3 maintains the engagement of internal and external gear teeth 1a and 42a and causes rotation of the pulley 1.

Figure 6:
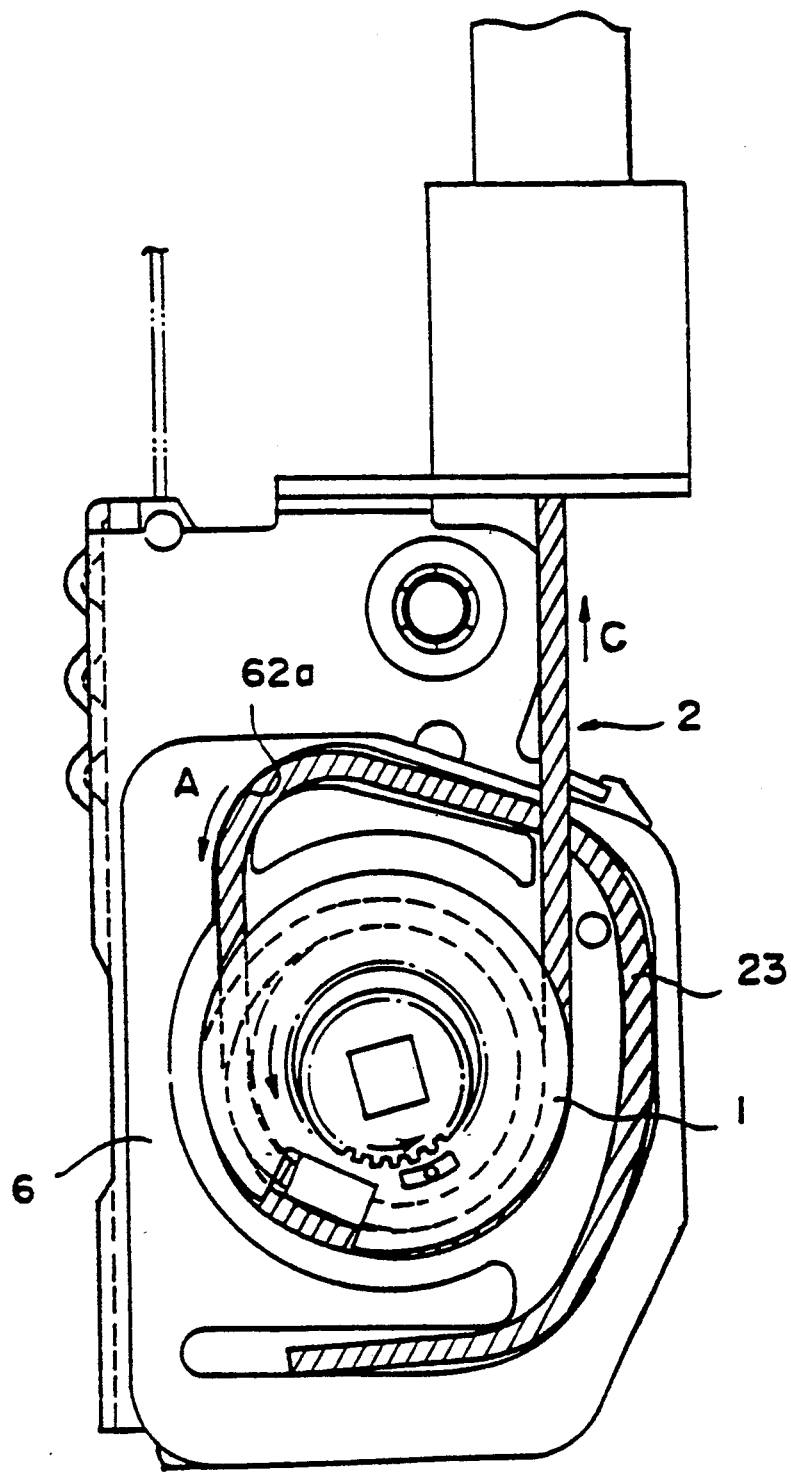
FIG. 6 is a side elevational view of the embodiment, again with the cover and retractor winding spring removed, and shows the pretensioner in the operating condition.

FIG. 6 shows the condition of the pretensioner when it is in operation. When operated, a braking force of constant load caused by the sliding of the pulling cable 2 made of stranded wire is continuously applied on the pulled segment of the pulling cable 2 because the pulling cable tries to remain straight by its inherent rigidity within the part 62a of the channel 62 with the small radius of curvature, i.e., the braking section of the brake block 6, as it is pulled out. Accordingly, vibration during the rotation of the pulley 1 is minimized. As a result, the pulling cable 2 functions as a guide for the pulley.

In the pretensioner of this embodiment, the pulling cable 2 is wound on the pulley by overlapping it in radial direction, and it is possible to provide a stroke sufficient to create the desired pretension on the belt 5 without increasing the axial dimension of the pulley. Also, unlike the conventional arrangement, a guiding unit is not furnished. Thus, the number of movable parts is limited to the minimum, and this contributes to the higher reliability of the operation.

The forgoing description is of an embodiment of the present invention, whereas the present invention is not limited to the above-described embodiment, and the arrangement can be modified according to the actual operating condition and the selection of the component materials within the scope of the description in the claims.

Figure 7:
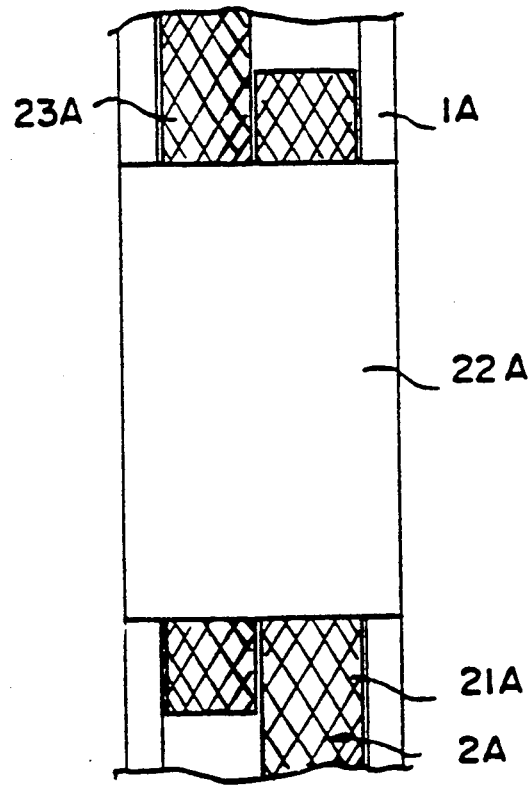
FIG. 7 is a fragmentary detailed view of the portion of the pulley and pulling cable shown in FIG. 5, but illustrating a modified arrangement of the pulling cable.

For example, the pulling segment and the pulled segment of the pulling cable need not be parts of a single cable, and these segments may be parts of separate cables. In this case, as shown in FIG. 7, the checking section 22a of the pulling cable 2a is formed by arranging a terminal end of the pulling segment 21a and a starting end of the pulled segment 23a in parallel and by caulking them.

As described above, it is possible with a pretensioner of the present invention to achieve the same operation control as in the conventional arrangement by having the pulling cable itself, cooperating with the pulley, function as a holding unit and as a guiding unit for the pulley. This contributes to the elimination of power loss during the operation and also to the improvement of the operational reliability by reducing the number of the movable parts.

We claim:

1. A belt pretensioner for a vehicle safety belt system having a retractor from which and onto which a belt is arranged to be unwound and wound by rotation of a reel shaft, the pretensioner comprising a unitary annular pulley having an internal driving surface and being ordinarily restrained in a position in which the driving surface does not engage a driven surface on the reel shaft, a pulling cable having a pulley-engaging segment wound onto the pulley and coupled to the pulley and having a pulling segment leading from the pulley in a pulling direction to a power source arranged to pull on the cable and translate the pulley to engage the pulley driving surface with the shaft driven surface and rotate the pulley and the reel shaft and pretension the belt by winding it onto the reel shaft, the pulling cable having a pulled segment leading away from the pulley-engaging segment from the end of the pulley-engaging segment opposite the pulling segment in substantially the same direction as the pulling direction and a portion of the pulled segment frictionally engaging fixed braking surfaces on the retractor, the pulley being normally restrained by the pulling and pulled segments of the pulling cable in a position in which the driving and driven surfaces of the pulley and shaft are not engaged and the pulley being translated to engage its driving surface with the driven surface of the shaft when the power source pulls the pulling segment by a force applied to the pulley by the pulling segment and by a force due to friction applied to the pulled segment by the braking surfaces.

* * * * *